United States Patent
Boitet et al.

(10) Patent No.: US 8,489,472 B2
(45) Date of Patent: Jul. 16, 2013

(54) PROACTIVE MONITORING AND INTERVENTION CAPABILITIES IN A PACKAGE DELIVERY SYSTEM

(75) Inventors: Val Corday Boitet, Alpharetta, GA (US); Erik Paul Sebusch, Alpharetta, GA (US); Guy Ellingwood, Cumming, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 503 days.

(21) Appl. No.: 12/117,534

(22) Filed: May 8, 2008

(65) Prior Publication Data
US 2009/0281929 A1 Nov. 12, 2009

(51) Int. Cl.
*G06Q 10/00* (2006.01)

(52) U.S. Cl.
USPC ............ 705/28; 705/26.6; 705/332; 705/333; 705/336; 705/337; 705/338; 705/339; 705/340

(58) Field of Classification Search
None
See application file for complete search history.

(56) References Cited

U.S. PATENT DOCUMENTS

| | | | |
|---|---|---|---|
| 5,804,802 A | 9/1998 | Card et al. | |
| 6,539,360 B1 * | 3/2003 | Kadaba | 705/28 |
| 7,197,465 B1 * | 3/2007 | Hu et al. | 705/1 |
| 7,356,481 B2 * | 4/2008 | Mitsuoka et al. | 705/8 |
| 2002/0120475 A1 * | 8/2002 | Morimoto | 705/4 |
| 2004/0153379 A1 * | 8/2004 | Joyce et al. | 705/28 |
| 2004/0194056 A1 * | 9/2004 | Combs et al. | 717/104 |
| 2005/0171738 A1 * | 8/2005 | Kadaba | 702/187 |
| 2005/0236479 A1 * | 10/2005 | Schmidtberg et al. | 235/384 |
| 2006/0235739 A1 * | 10/2006 | Levis et al. | 705/9 |
| 2007/0005452 A1 * | 1/2007 | Klingenberg et al. | 705/27 |
| 2007/0012602 A1 * | 1/2007 | Baldassari et al. | 209/583 |

* cited by examiner

*Primary Examiner* — Ryan Zeender
*Assistant Examiner* — Fateh Obaid
(74) *Attorney, Agent, or Firm* — Alston & Bird LLP (57) ABSTRACT

A system and method for proactively monitoring the status of packages shipped by a package delivery carrier including intervening when certain conditions arise. The system identifies certain packages are requiring proactive monitoring and intervention, and monitors a variety of conditions, including system-wide impacts and package-level specific impacts, which may necessitate intervention by carrier personnel. Intervention may include various exception handling actions, including upgrading the level of service, stabilizing the temperature of the package, inspecting damage to the package. The carrier may notify the consignee or consignor of such detected conditions and may then communicate with appropriate individuals involved with the package delivery to ascertain the most appropriate action necessary. The system facilitates communicating such information to appropriate carrier personnel. The system may also maintain a real-time case log regarding the package, which can be accessed by service representative, package handling personnel, and said appropriate individuals.

8 Claims, 4 Drawing Sheets

PROACTIVE MONITORING AND INTERVENTION CAPABILITIES IN A PACKAGE DELIVERY SYSTEM

FIELD OF THE INVENTION

Various embodiments of the invention generally pertain to proactively monitoring the delivery of a package by a package delivery service provider, including intervening in certain circumstances.

BACKGROUND OF THE INVENTION

In the package delivery context, a variety of services can be provided to the originator of a package (called the consignor) and the recipient of the package (called the consignee). The package delivery service provider (also called the carrier) may provide various service levels, and ancillary services, such as notification of delivery and special handling processing.

For example, U.S. Pat. No. 6,539,360 provides that special instructions for handling a package can be conveyed, including holding the package for pickup by the consignee at a certain location. Further, status and limited notification capabilities can be defined to inform a user when a delivery is expected to occur. However, the capabilities are somewhat limited with respect to providing collaborative information sharing and resolution.

BRIEF DESCRIPTION OF THE SEVERAL VIEWS OF THE DRAWING(S)

Reference will now be made to the accompanying drawings, which are not necessarily drawn to scale, and wherein.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Certain types of packages conveyed by a package delivery service ("carrier") are extremely time sensitive or otherwise require special handling, and thus require additional steps to ensure that packages are delivered within a certain time frame and in a certain condition. In such cases, merely providing tracking information and 'visibility' as to the status of the package, such as is well known in the art, using presently offered information tools, is not sufficient to meet the customers needs. In many cases, a more involved interaction is required between various parties, typically including the consignor, but potentially also including the consignee, the carrier, and in some cases, a third party to ensure that the package is delivered according to the needs of the customer.

The prior art provided reporting of information, but in various embodiments of the present invention, the information exchange is more of a collaboration or interactive information exchange. The prior art systems provide information about a package's status to a user, and in some cases may allow a user to select options associated with its delivery, but this is not sufficient for handling an exceptional case. An "exceptional" case or "exception," is any situation that deviates from the normal, anticipated delivery of a package. While most of the delivery instances are not exceptional, in certain instances, deviations from the expected or desired handling are required. Because such instances are by definition, special cases, they are called "exceptions." Such exceptions represent any infinite number of possible occurrences, which by their nature cannot always be categorized or addressed by applying a predefined or set action.

One such industry segment having critical delivery requirements includes the healthcare industry. Such packages typically have a very high value to the consignee or other parties, and could contain, for example: medications or surgical supplies, including human tissue samples. Other examples include delivery of perishable item or commodities, delivery of high valued items, and delivery of hazardous material. In such instances, merely providing tracking information (e.g., "shipping status") in response to a user entering tracking information at web site, for example, is not sufficient to fully apprise the user of the situation associated with the delivery of the good. In many prior art systems, the user is required to proactively monitor the status, which may not always be practical. Other systems have the capability to issue a notification to a designated recipient, but such systems may not be flexible enough to allow interaction with a user. For example, some system may provide an email notification regarding the status of a package, but because such emails are generated from automated systems, any response by the recipient is of little value, and likely to be ignored.

Although various embodiments of the present invention are disclosed in terms of delivering packages and package carriers, the various embodiments applied to delivery of freight and goods, regardless of its classification as a parcel, package, container, truckload, pallet, or other indication. Further, the principles of various embodiments can apply to a package delivery provider, freight forwarded, trucking company, courier, or any other designation used to refer to a provider or transporter of goods. Further, the provider of goods is not restricted to a public carrier, but could be a value added coordinator of goods, which potentially contracts out to carriers of various sorts to provide various transport services.

Various embodiments of the present invention overcome the disadvantages of the prior art by maintaining a portal—e.g., information gateway, allowing information to be reviewed, interrogated, presented, and responded to between various parties, thus allowing interaction between a customer and a customer service representative ("CSR"). A high level overview of the process is shown in FIG. 1.

Figure 1:
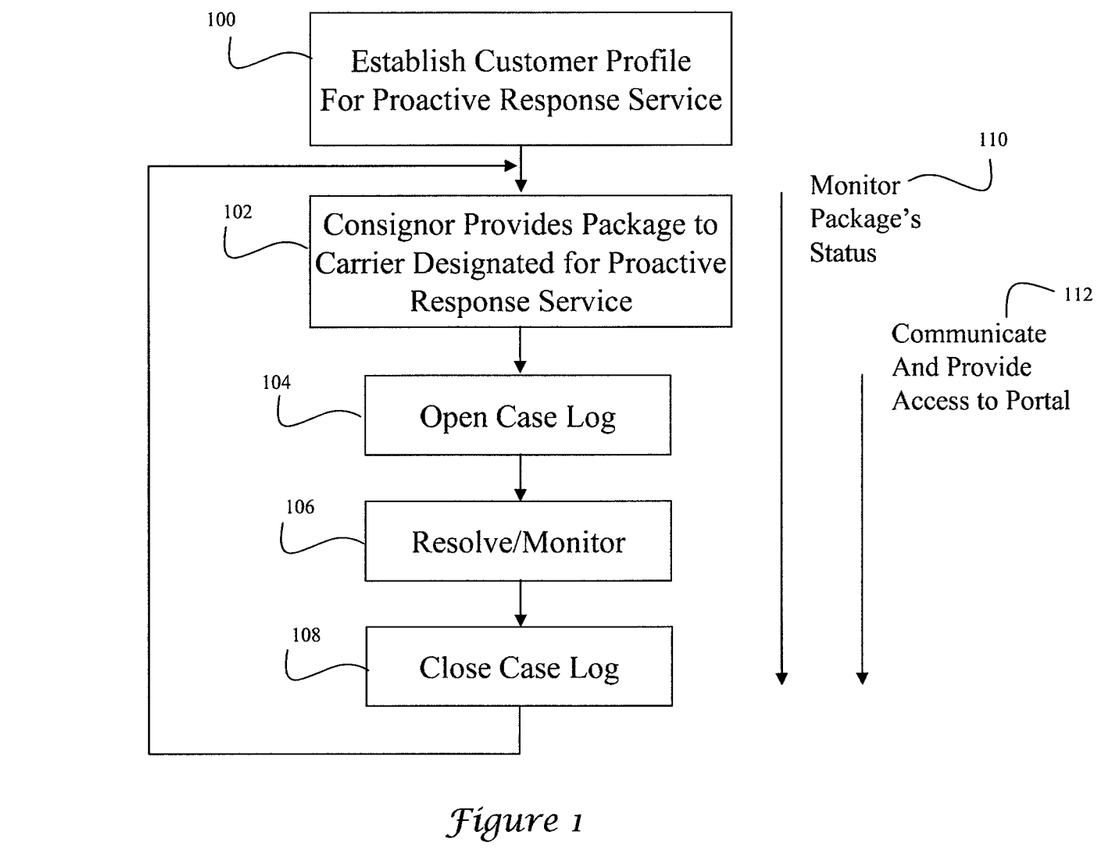
FIG. 1 discloses one embodiment of the steps of the present invention involved in providing proactive monitoring and intervention in conjunction with the delivery of a package.

In FIG. 1, the customer first establishes a profile in step 100. In a preferred embodiment, the customer is the consignor. However, other embodiments are contemplated in which the customer is the consignee, agent of the consignor or consignee, or even a third party. Typically, the consignee is the most interested in the delivery of the package, as opposed to the consignor, but in many business interactions, the consignor is involved if there is an exception occurring in the delivery. Usually, the carrier contracts with the consignor for the carriage of the goods, not the consignee. A third party, who may be the ultimate user of the goods, may also be involved.

Each customer profile maintains information associated with that customer, including a series of contact names, contact information (including, but not limited to, email address, telephone number, pager number, fax number, etc.), criteria information, customer number, etc. This information is above and beyond what is typically required by a customer in establishing an account with the carrier, although some of the information may be repeated. For example, the customer number assigned by the carrier can be used to reference the customer's profile. Further, a series of customer numbers may be linked together in a common profile (such as when a corporate entity having multiple shipping departments, such as on a campus, is consolidated under a common customer profile. Once the profile is established, the carrier has sufficient information to ensure that the customer can be contacted and provided access to a portal with information on a particular shipment. Typically, the customer profile is established once, and is a necessary prerequisite to operation of the service. While customer profiles are known in the prior art, this customer profile contains information for the purpose of managing certain shipments, designated as "PR packages" (e.g., packages indicated as receiving proactive response treatment.)

The next step occurs in step 102, where the consignor provides a package to the carrier which is designed as a PR package. Packages are typically specifically designated as requiring PR, and such designations may be used to bill the customer for the additional service level and to discriminate the additional services provided to the PR package. The customer may be charged for this service on a per-package basis, a flat rate (regardless of the number of packages), or some other way. The PR indication is typically conveyed from the consignor to the carrier using a shipping system, which the consignor uses to indicate parcel level detail (PLD) information, including the consignor's address, the consignee's address, class of service, weight, and other information associated with shipping a package. The PR may be considered as an accessorial indication or a class of service indication, and typically would apply to a high priority class of service, for example, next day air delivery service, or second day delivery service. There can be a number of PR indication codes, which provide some high level information regarding certain common conditions concerning the temperature of the shipment. These codes could indicate the nature of the contents (e.g., "medical supplies"), or other attendant conditions (e.g., "must be maintained below 90 degrees Fahrenheit at all times"). In other embodiments, there may be a series of code (e.g., indicating contents and conditions separately). In other embodiments, the user may be able to provide user-defined text information.

The PR indication is conveyed with the PLD information from the consignor to the carrier' systems and the carrier will typically store this indication in conjunction with the PLD information in various database systems. Typically, the PLD database maintains records in a database that are indexed using a package tracking number. In this manner, the carrier has enough information so that when given the package tracking number, the carrier can then identify the customer profile, should the information contained therein be required.

The next step 104 involves opening a "case log", which is information associated with a particular package. At this point, an implementation option exists as to whether the case log is opened for every PR indicated package, or for only PR indicated packages which are, or expected to undergo, problems in their delivery. In the preferred embodiment, a case log is created only when information indicating an "at risk" incident is identified. This approach may minimize the data storage requirements and only store data when exception conditions are noted.

It is possible in the former instance to open a case log for every package that is indicated as being associated with the PR service. In the case where the package is delivered as expected, the case log will contain minimal information, and could duplicate the scanning and tracking information found in regular package handling tracking databases. An alternative implementation would be to track the scanning and tracking information as in regular package databases, and simply record a flag in the PLD database indicating that the package is associated with the PR service. As will be discussed later, the carrier's systems will proactively monitor PR-associated packages to determine whether a problem for a particular PR indicate package develops, or has developed. In cases where no problem has developed with respect to a PR indicated package, the exception handling procedures associated with the PR service do not come into play. A package which is, or may be subject to a condition adversely impacting its delivery can be called a package in "jeopardy." Explicit "jeopardy" indicates may be defined in the PLD database or case logs that flag such packages are requiring exceptional handling. Consequently, most of the embodiments disclosed herein focus on instances where exceptional handling is required.

If exception handling is required, then a case log is opened. The case log is the logical collection of information associated with the disposition and status of the package that can be accessed by various parties. The information retained is focused on not only the status, but other information associated with handling and communicating of information between the various parties. The case log may be implemented in various ways, including linking related sets of information, and does not necessary imply a particular implementation or storage arrangement.

The next step, indicated in step 106, involves the resolution of the current or potential problem (e.g., jeopardy situation) associated with the delivery of the package and monitoring of the package. At this stage, status information is logged, instructions from customer service representatives (CSRs) are recorded, and access to the information is provided to relevant parties.

Finally, in step 108, the case log is closed, which typically occurs when the package has been successfully delivered. Typically, once the package is delivered, additional status and information is no longer recorded, and the log can be archived. Such case logs can be subsequently retrieved and used in generating reports.

The process then repeats by returning to step 102, in which the customer provides another package associated with the PR service. This loop essentially continues for each package provided by the customer that is associated with PR service, for as long as that customer is a subscriber to PR.

After a package is provided by the customer (e.g., starting with step 102), various carrier systems will monitor and track the package, as indicated by arrow 110. The monitor and tracking occurs systematically, that is, by various automated systems that scan, trace, and report PLD information as part of the normal, automated sorting of packages at the various points along the carrier's routing of the package. These systems track the PR package using the same infrastructure (e.g., bar code readers, RFI tag readers, etc.) that are used with non-PR packages, but the data received is correlated with a particular package (as identified by the bar code or package tracking number) and identified as being associated with the PR service, or in other words, identified as a PR package. The PR systems will record a flag based on any information that indicates or suggests that a PR package is in jeopardy, which means either an actual or potential problem.

The "problem" (or service affecting condition) can be varied, and is not limited to the embodiments listed herein. Several common problems include 1) a time-delivery sensitive package which is not on schedule, 2) a temperature sensitive package which is not within the specified temperature range (or in an environment which is outside the required temperature range), or 3) a package which has exhibited damage, which threatens the integrity of the contents (e.g., a leaking contents).

Other service affecting conditions detection of a missing anticipated load scan. For example, when a package enters a sorting facility, it is normally scanned and routed appropriately, which may include transloading the package from one vehicle to another. Since a package may be scanned when off-loaded, it is expected that another scan would be encountered to load it onto the next segment of its route. Any exceptions noted can be checked to determine whether the particular package is associated with PR service. Further, the scan information can be compared against an anticipated scheduled—e.g., given a starting date for conveying the package with a known route, it is expected the package should be scanned at certain points along that route at certain times. Again, detecting an anomaly condition based on date can also trigger action. Other information includes other anomaly such as incomplete or inconsistent scan information (e.g., zip code information is not matched with a destination address, etc.).

In summary, the service affecting conditions can be reactive or proactive in nature. Because there are a wide number of potential service affecting conditions, various embodiments of the present invention are intended to accommodate a variety of problems. Because there are numerous customer-specific requirements that cannot be anticipated in each and every case, various embodiments of the present invention provide the infrastructure for accommodating these various situations, without having to define in advance, each type of condition. Thus, as additional conditions are identified, they can be incorporated into the framework of various embodiments of the present invention.

The monitoring of problems may be first reported by automated system, but it can also occur, and be reported, by human intervention. Human reporting can occur by various types of carrier personnel, including: delivery vehicle drivers, sorting personnel, customer service representatives. These individuals can report problems based on their own observations (e.g., a delivery or operations personnel notices a PR package is damaged and leaking contents). Or, operations personnel may note a potential issue, and report information to the Case Log associated with the package, or contact a CSR involved with PR packages. Alternatively, the customer (typically the consignor) can initiate a report (e.g., the package needs to be returned to consignor immediately—e.g., "intercepted"). In many situations, multiple individuals (e.g., different customer service individuals or different individuals associated with the customer) may be reporting or updating information in the case log. When a customer service representative notes an exception associated with the package record, this typically automatically generates a case log if it is associated with a PR package.

The reporting typically occurs via the individuals providing information either to a CSR via telephone contact, or information via computer to a portal (e.g., a web site). Regardless of how the information is collected, eventually the information is recorded in the appropriate case log, so that information can be readily accessed by various individuals when needing to know the status of a particular package.

Once the case log is created, the information is stored (logically) in the PR database (e.g., "portal") which can be communicated and accessed by various individuals. As shown by the arrow 112 in FIG. 1, once created, the portal is designed to be a central clearinghouse of information to facilitate resolution of the any service affecting issues. The portal allows recording and posting of various information, including times of where the package has been scanned, locations where it was last scanned, personnel involved in handling the package or reporting problems, etc. The portal may provide a subset of the information to the customer, and the full set of information to carrier personnel.

The relationship between the various entities described above is further illustrated in FIG. 2, which illustrates one embodiment of the logical relationship between the information gathered and the different parties accessing and updating the information.

Figure 2:
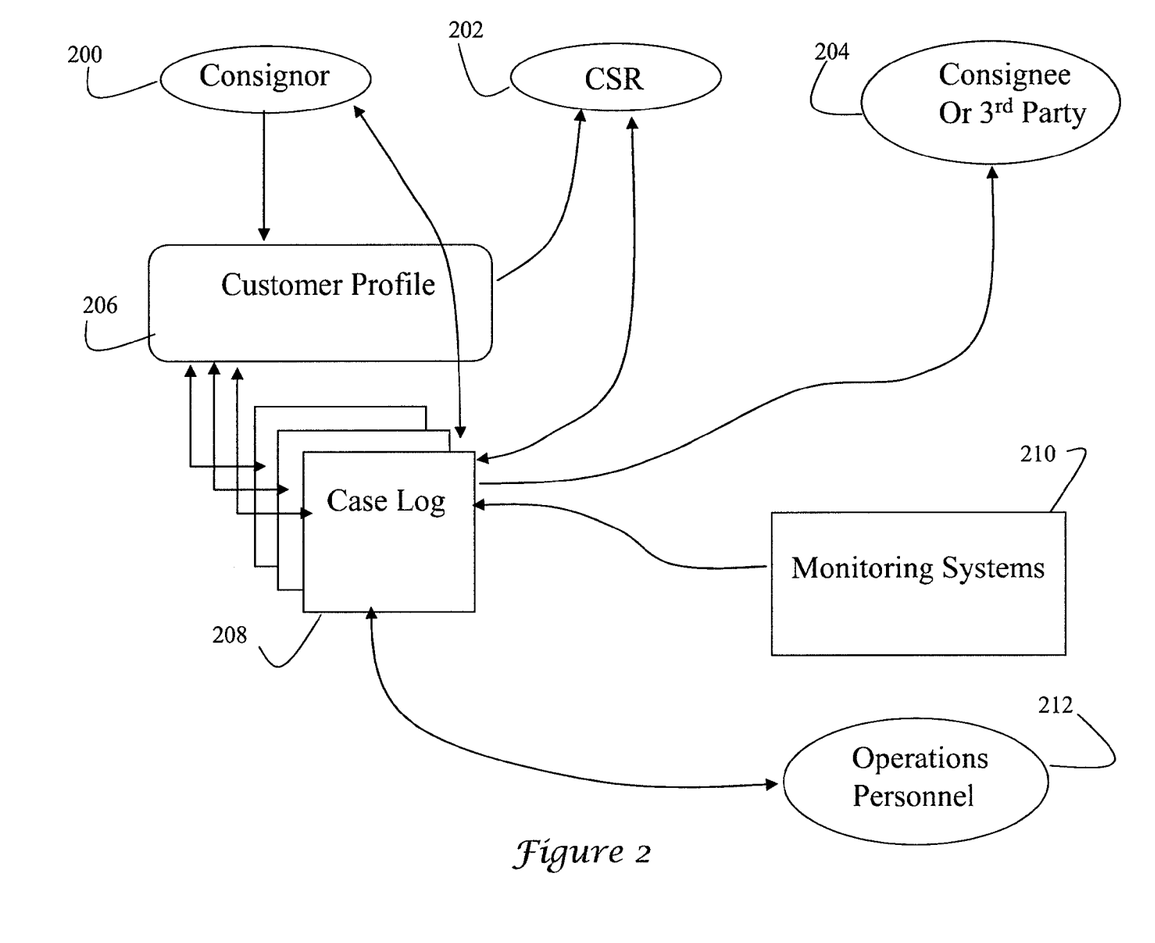
FIG. 2 discloses one embodiment of the relationship of a customer profile and case log with various entities.

In this example, the consignor 200 is the originator of the package and the entity establishing the customer profile 206. In other embodiments, the customer could be considered the consignee. The customer profile contains contact information that may be used in resolving a problem associated with a PR package delivery. The customer establishes the profile, which can contain the following information;

a. Primary Shipper Number, account holder name and address,
   b. Affiliated Shipper Numbers,
   c. Contact Information for PR packages,
   i. Primary and secondary contacts,
   ii. Name, method of contact (phone, pager, email, text messaging),
   iii. When to contact (e.g., time windows, days),
   d. Types of exceptions requiring customer contact,
   e. Customer event preferences requiring carrier's attention
   i. contingency actions to be taken when certain service affecting conditions occur, such as
     1. e.g., when/how to deliver package if package is not delivered on anticipated schedule
     2. alternate delivery location if normal delivery is impacted
     3. who to contact if an exception occurs (e.g., package is exposed to high temperature)
     4. who to contact upon delivery after an exception occur
   f. Recovery Options
   i. Make another delivery attempt (date and/or time specific)
   ii. Upgrade package to higher level of service
   iii. Line flight
   iv. Return to shipper
   v. Hold for Pickup at facility
   vi. Hold for future instructions or future delivery
   vii. Redirect to another address
   viii. Refrigerate package
   ix. Replenish dry ice (e.g., add more dry ice to package)

The information listed above is not exhaustive, and is exemplary to the type of information that can be maintained. Because, as noted, the possible service impacting possibilities are varied, the information maintained should, in various embodiments, be flexible enough to accommodate different circumstances. Other embodiments may incorporate more or less information.

In addition, the customer profile 206 is linked with various active case logs 208, which represent those packages associated with that customer which have been (or are currently)

shipped that have been designated as receiving the PR service. In other embodiments, the case logs could actually be part of the customer profile, but in the preferred embodiment, these are separate data structures which are linked from the customer profile, as well as via other information.

In the preferred embodiment, the customer interacts with a customer service representative ("CSR"), who then interacts with the customer profile. In other embodiments, it is possible for the Consignor 200 is shown as being able to interact (e.g., read and write) information on a limited basis associated with a particular case log. The customer service profile may also be linked to closed case logs. Typically, the CSR has full authorization to modify the customer service profile, whereas a customer would have a more limited set of capabilities.

The status associated with a case log 208 can be provided by automated monitoring systems 220 or operations personnel 212. As described before, either source can provide information about a PR package. The various monitoring systems including monitoring, recording, tracking, and processing systems, which variously process packages in various locations. These include sorting, conveying, dispatching systems and equipment, and may variously involve scan and detect packages in the normal course of handling. The monitoring systems could be those systems known in the art, as well as future developed automated systems, such as those which read RFID tags on the packages, and report any abnormal conditions (including, e.g., temperature, moisture, vibration, or light). Additional technologies that may be used for monitoring further include Bluetooth, WiFi, UWB, UHF, and MMW. One of ordinary skill in the art can envision several technologies that may be utilized for various monitoring purposes.

Although not shown in FIG. 2, the operations personnel may provide information to the call log via the CSR. That is, operations personnel may call and interact with a CSR, and provide the tracking number, which in turn allows the CSR to retrieve and update information in the case log based on information provided by operations personnel.

The CSR 202 is also able to read and write information about a particular case log. Typically, the CSR is the point of contact between the carrier and the customer. Consequently, the CSR may use a computer terminal at a workstation to readily access and update information on a PR package. Finally, in some embodiments, the consignee 204 or other $3^{rd}$ party may be able to access information in the case log. Such permission may depend on the authorization granted by the consignor and the carrier. Typically, the system precludes a party from erasing information in a case log, as the record developed may be important in settling subsequent disputes.

In this manner, all relevant parties involved in a high-value shipment can ascertain the status, and actions taken for intervention of a package shipment, and keep abreast of up-to-date information affecting the consignor and consignee.

Case Log Management Functions

Case log management refers to the actions that can be taken with respect to a particular case log. Typically, a case log is identified by the package tracking number and associated with a particular customer profile. In instances where a particular case log is not known, it is possible to view all pending (e.g., open) case logs associated with a customer profile and select a particular one. This is possible since the customer profile is linked with the customer's case logs. Typically, though, a package tracking number is used to identify a particular case log and is known by the party requesting case log information.

Once the case log is retrieved, there are various operations that can be performed in conjunction with a case log. The case log contents can be created, viewed or read, updated, or closed. Typically, a CSR will view or update a case log previously created. Various systems may be restricted as to the case log functions performed and how they interact with the case log. For example, in FIG. 2, the various monitoring systems may access the case log via an application programming interface ("API") and be restricted to only updating monitoring/tracking information. Because such systems are machines, an API interface is preferable. On the other hand, the operations personnel updating the status of the case log typically use a human interface system, such as a web access or other type of graphical user interface system. Some operations personnel may be limited to updating status only, whereas others may be given greater authorization level to provide input regarding PR packages in jeopardy.

The case log maintains information about status of the package, and typically includes scan location and times along the route as the package is being processed and handled. In various embodiments, other information, such as temperature, shock, g-force, vibration, light, moisture, and noise readings, for example, may be recorded. Thus, it is within the scope of various embodiments of the present invention that various sensors affixed on or in the package may wirelessly transmit readings which are recorded at processing points along the route. Typically, once information is recorded in the log, it cannot be altered, nor can personnel delete a case log. For example, once a package is scanned at a location and time, the information cannot be amended, but only augmented. This ensures the integrity of information is maintained and that accurate records are maintained and accurate reports are produced.

FIG. 2 does not illustrate other miscellaneous inputs that can be received, which may indirectly impact case logs. A PR system may receive global or system wide information that may impact a number of packages, including some PR packages, and thus put those PR packages in a jeopardy situation. For example, a system wide information may be of a delay at a particular airport due to weather problems. The PR system (or another system) can ascertain which PR packages are affected, and update/create case logs for the appropriate packages. Once created, automatic notifications may be provided to CSRs or customers regarding the status.

Figure 3:
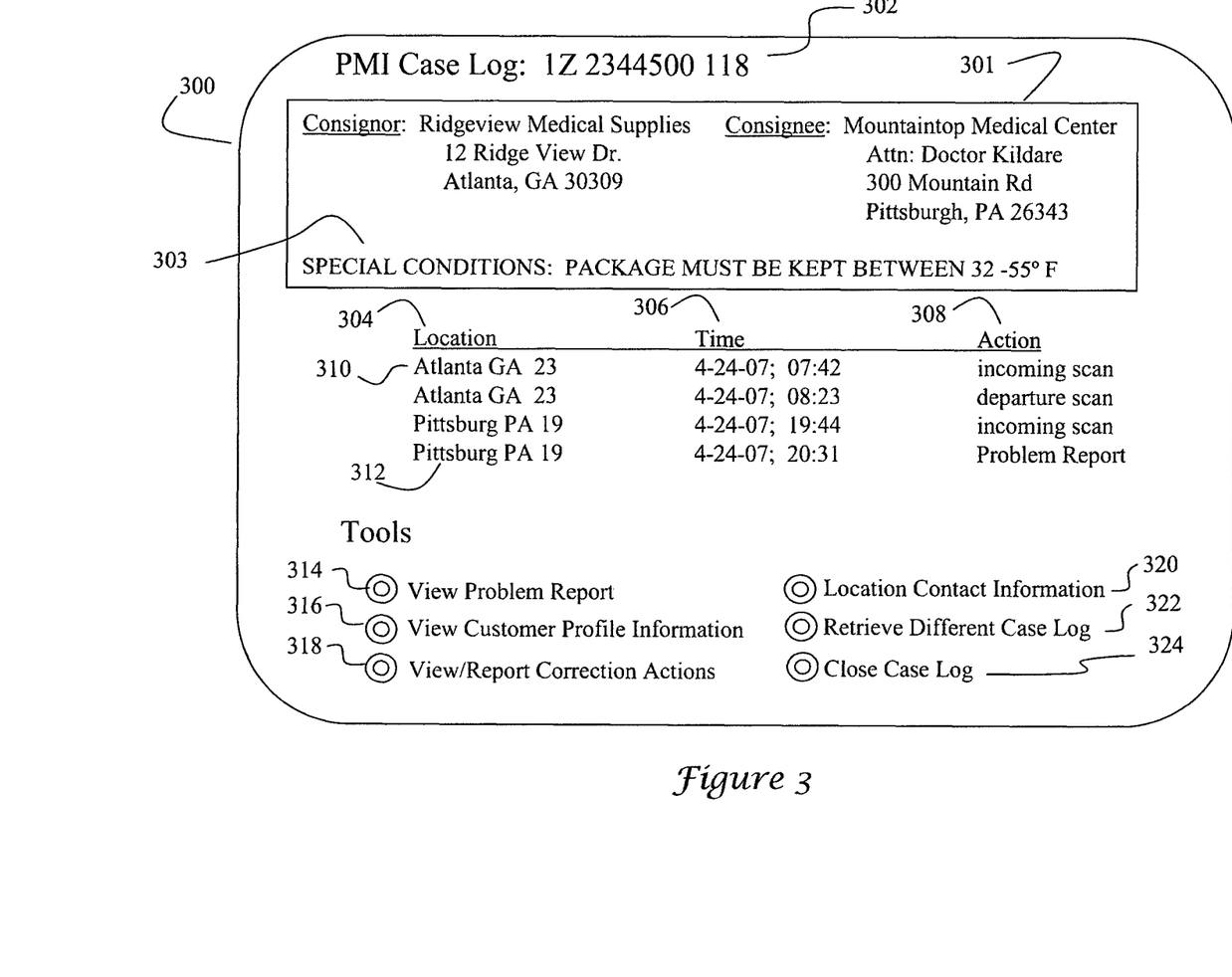
FIG. 3 disclose one embodiment of the various functions associated with case log management of the present invention potentially available to a customer service representative.

FIG. 3 illustrates one embodiment of the information presented in a call log to a CSR. FIG. 3 illustrates a screen shot 300 of some information that a CSR would view after having identified and selected a particular PR case log, as identified by the package tracking number 302. The information may include information readily available from the PLD database; including, for example, the consignor's and consignee's address 301. Other embodiments may include certain information from the customer profile (e.g., customer shipping number, contact name, etc.) The PLD information provides the CSR with some high level context regarding where the package is going from and to. The information typically also includes information specific to the critical nature of the shipment, (such as the aforementioned PR indicator code) which is typically not part of the PLD information normally retained by the carrier. In this case, this information is shown in line 303 which reflects that the contents of the package must be kept within a certain temperature range.

The next portion is the scan/location information, which indicates the location of the package scan 304, the time package scan 306, and the action that occurred 308. For example, the first entry indications the package was received in the Atlanta Ga. facility (#23) on Apr. 24, 2007 at 7:42 a.m. Typically, this table includes scan information, but it is not limited to such. For example, the last entry 312 indicates a "Problem Report" was initiated. In many embodiments, each field may be hyperlinked to other information, which provides additional details.

At this point, the CSR may select one of the tools indicated. These are exemplary, and other embodiments could present different information or options. Typically, the CSR would need to view additional information regarding the problem, which could be accomplished by selecting the "View Problem Report" icon 314. Selection would provide a text based window, presenting the user with further information regarding the problem. The problem could be identified by a code, which could be presented by itself, or which is mapped to a text message. Alternatively, the text describing the problem could be 'free text' that was inputted by operations personnel at the location of the problem (e.g., who first detected the problem).

The CSR could select "View Customer Profile Information" icon 316 which would provide all the relevant contact information contained in the customer profile, should the CSR need to contact the custom for any reason. As previously indicated, the customer profile maintains information for contacting the customer for certain 'high value' shipments, and may be a different contact than maintained for regular packages. The CSR could alternatively select "View/Report Correction Actions" icon 318 which would provide a text-based interface stating the findings of actions taken. Typically, the information presented would be augmented to report ongoing actions taken, if they occur and are reported. The CSR could select the "Location Contact Information" icon 320 which would present a window of the appropriate contact names and information (e.g., telephone number, cell phone number, etc.) for carrier operations personnel at the last location. For example, in the above example, the sorting facility at "Pittsburgh Pa. 19" may have a designated PR contact (e.g., Center Manager (Day Shift) John Smith, 412-555-1234) which the CSR could use to obtain information from the facility where the package is located. In other embodiments, the contact information would list a generic contact number of the sorting facility, without naming a dedicated contact person. Other embodiments may also, or instead, list an email or other address for the contact, or a generic email address suggestive of the function (e.g., "PR_exception_contact"). The system would link the contact information with the last known facility, which could in some instances be a dispatch driver. This facilitates the CSR being able to contact the appropriate person, at the appropriate location in a rapid and easy manner. In the case that package has been dispatched and is on a delivery vehicle, the contact information could not only include the contact information of the dispatch center, but the appropriate driver's cell phone, or other communication device information, such as an electronic address for a portable computer carried by the driver.

Finally, the CSR may be able to select "Retrieve Different Case Log" 322 for another package, or "Close Case Log" when the problem has been resolved. Other actions may be defined, to facilitate the job functions of the CSR.

The screen presented to the CSR is typically not the same information available to a customer accessing the call log over the web. Typically, additional information or functions are available to the CSR which are not made available to the customer (such as the names and contact information for operations personnel at each sorting facility). The types of information available to the customer can be controlled by carrier, and such access may be password protected or otherwise limited. The customer, which in this case is the consignor, may choose to allow other parties, such as the consignee, to access the information. In this manner, all the relevant parties can obtain real time information regarding the disposition of the package.

Typical Application

A typical application using the above embodiments is now provided to illustrate application of the present invention. Because a variety of problems can arise creating a jeopardy situation, and which can be reported by operations personnel or by automated systems, there are various combinations possible, which cannot all be disclosed. Therefore, it should be understood that the application discussed below is provided for illustration purposes only and in no way should be construed to limit the scope and application of the present invention.

In one illustration, a consignor ships medical supplies, such as medication or an antidote, which must be kept refrigerated. The supplies are packaged using a thermally insulated container, which is surrounded therein by some form of ice packs to keep the temperature low. The supplies and ice packs are packaged up into a box, and provided to a carrier. A shipping system is used in preparing the manifest, and the necessary package level detail information (e.g., consignor, consignee, class of service, etc.) is electronically conveyed to the carrier so that the carrier knows how to process the package.

In this example, the consignor has subscribed to PR service capability, and indicates that the package is to be associated with PR service. The consignor provides a code indicating that the contents are temperature sensitive.

The package is shipped from Atlanta to Pittsburgh in the middle of summer, during a heat wave. The package is sent to the attention of a certain doctor at a hospital needing the supplies. Because of the urgency of the situation, the doctor needs to know if the supplies encounter any "problems" associated with the shipment, as is the consignor (the medical supply house) and the hospital (consignee). If the contents of the package do not remain cool, the contents will be destroyed, and the patient will suffer adverse consequences. Thus, all the parties need to know if there is a problem, and the status of the shipment.

During the course of normal handling, the various package handling and sorting equipment operated by the carrier identifies the package, and records the scan information on the package using machine readable means, as the package progresses along the route. En route, the package is received at the carrier's sorting facility in Pittsburgh near the airport. The package is readily identified as requiring proactive monitoring and intervention, typically via a label affixed to the package. Other indications may be used, such as codes in the tracking number, or other machine/human readable indications. An alert package handler notices that a corner of the packaging is wet, and dripping a clear gel-like liquid. The ice-pack in the box has developed a leak, and has soaked through the packaging. The alert package handler pulls that package out of the flow of normal sorting, and either brings it to the attention of a person designated locally as resolving such issues (the PR contact person), or the package handler personally calls a dedicated telephone number and reaches a customer service representative handling PR problems. The package handler identifies the package via the tracking number to the CSR, and the CSR retrieves the case log as associated with the tracking number. The CSR uses a computer, which connected to an intranet, accesses the PR system, which retrieves the case log from the PR database and presents it to the CSR. The CSR immediately knows that the package is destined for Pittsburgh, and that it is on time, and that the contents are to be kept cool. Specifically, based on information provided by the consignor, the contents are to be between 32-55 degrees Fahrenheit.

The CSR is able to communicate with the handler and ascertain the problem. The CSR is able to retrieve the customer profile, and contact the consignor. Specifically, the CSR is able to retrieve a telephone number and name of the consignor and identify the problem, namely that a fluid is leaking from the package. The consignor indicates that the package was packed in ice, and that some of the ice likely melted and leaked out. The consignor requests that the package be kept cool, which can occur by placing the package in a cooler with additional ice or placing the package in a special facility (e.g., refrigerator). The availability of such special facilities may vary based on location.

Alternatively, the CSR may receive information from the consignor regarding the desired action to be taken based on information stored in the customer profile, thus negating the need to call and talk to the consignor. For example, the information may indicate that the contents of the package should be repacked in ice and repackaged in an entirely new container. In addition, a temperature sensor may have been packed in the package and the information from the consignor may indicate to download the information received from the sensor to the consignor. Lastly, the information from the consignor may indicate to send a photograph of the package to the consignor for review.

In such a case, the CSR may initiate a message to the consignor indicating the problem detected and the action taken in response. The CSR relays the instructions to the handler, which the handler promptly performs and acknowledges the same to the CSR. The CSR notes the problem recorded, the actions taken, that contact with the consignor was accomplished, and that the package was iced by the carrier to avoid it from being overheated. The carrier completes delivery of the package, and the case log is manually closed in response to the delivery of the package. In the meantime, the consignor (or other party) receiving the notification may receive an email comprising the tracking number and a web-site identifying the case log, which the recipient can readily access to ascertain the status. In other embodiments, the doctor may have knowledge of the tracking number and may want to access the case log, to ascertain what happened, when, and what actions were taken.

Access to real-time information by the involved parties may mitigate any problems encountered, and provides for greater customer satisfaction. Access to the information by the consignor, the consignee, and the carrier maintained in a central repository allows the prompt identification of the problem, prompt communication of the problem, and resolution of the problem so that the medical supplies can be delivered in time.

System Embodiment

Figure 4:
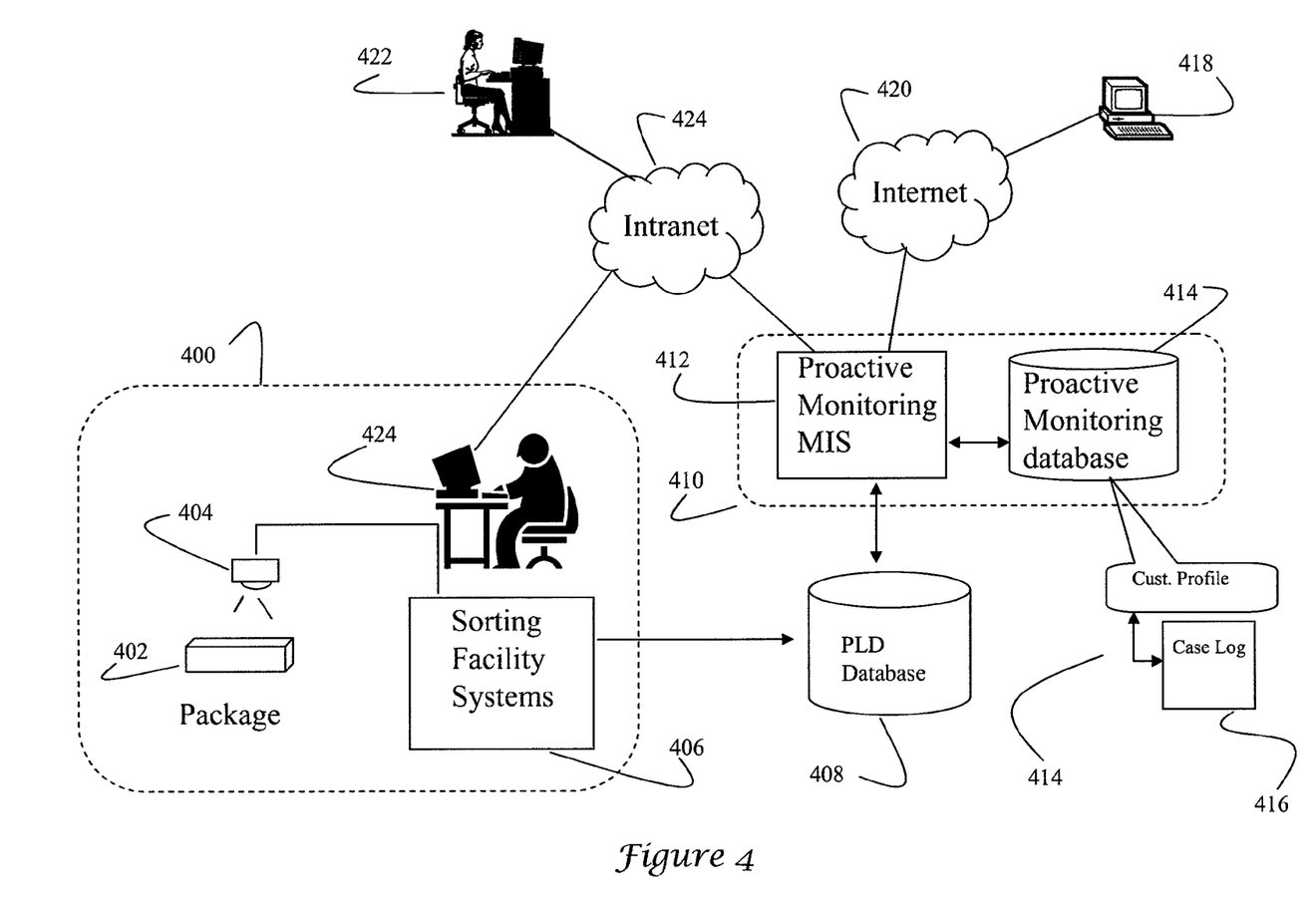
FIG. 4 discloses one embodiment of the various entities involved with a system accomplishing proactive monitoring and intervention.

One embodiment of the system at a high level is shown in FIG. 4. In FIG. 4, a facility 400 is illustrated which processes packages. In the present example, a package 402 is being scanned. This refers to the process of a machine reading a package identifier which provides the package tracking number to a system 406 at the sorting facility, which is performed to determine what sorting action should be taken with respect to the present package. The sorting facility system 406 may access a PLD database 408 to determine the appropriate action. In the process, the PLD database 408 records the scan information as to where and when the particular package was last processed.

In this case, it is presumed that the package is designated as receiving PR service. This could be codified on the label, or explicitly or implicitly coded in the tracking number, so that the PLD database receives an indication that this is a PR package. Alternatively, the PLD database may treat the information as it would any other (e.g. non-PR) package and maintain a separate PR indicator stored when the PLD record was initially created.

The PLD database interacts with a PR management information system ("MIS") 410. In one embodiment, the PLD database provides the scan information for PR packages by "pushing" PLD information to the PR database. In other embodiments, the PR MIS system 410 "pulls" information regarding specific PR packages from the PLD database. In either embodiment, the result is that the PR MIS system is able to ascertain the current scanning information for a given PR package as identified by the tracking number. Whether this information is duplicated by the PR or accessed from the PLD database is an implementation option.

The PR MIS system 410 comprises a processor 412 and a PR database 414. The PR MIS system handles queries from users and interacts with other carrier systems (such as the PLD database). The PR database 414 stores information regarding the customer profiles 414 for a specific customer and the specific case logs 416 for that customer.

As noted before, a package designated as receiving PR treatment may initially have little information. In this case, a special type of a case log(e.g., one which does not indicate any exceptions) may be defined. Certainly for packages which have problems associated with them of some sort, there exists a case log file identified by the package tracking number that indicates the problem encountered.

The indication of a problem can come from various sources. For example, the PR MIS system may periodically process information pertaining to certain packages to ascertain whether the packages are on schedule, and if not, flag these packages as having a potential problem in the PR database. Other external systems (not shown) can provide indications to the PR MIS system 412 of potential or actual problems on an individual package basis or system wide basis. These will be recorded in the appropriate case log file.

A customer service representative 422 is able, via a corporate intranet 424, to access the PR system 410 and ascertain the status of a particular case log e.g., package). This may be in response to a question for a customer (not shown) as the CSR is also able to communicate via telephone with customers as well as internal operations personnel. The PR MIS processor 412 provides the web-based interface for the CSR, and manages communications with the PR database. Further, the PR MIS processor 412 also provides access via the Internet 420 to external users, such as the consignor 418. The PR MIS system may filter information for external users, relative to the information provided to the CSR.

Finally, in order to resolve a problem, the CSR 422 is able to use the corporate intranet 424 to communicate with the appropriate personnel 424 at the appropriate facility processing the package at the moment. (Telephone access is also possible, but not shown.) The operations personnel 424 may also be able to access the case log file 416 to update information regarding the package or to address the service impacting problem (e.g., to intercept the package, take remedial action such as replenishing ice, etc.).

Some of the aforementioned components are not shown, such as the other communication infrastructure allowing the CSR to communicate with the customer (e.g., via telephone, pager, email, short message service, etc.). Further, the CSR is able to communicate with various possible personnel of the carrier, which may be in any one of several sorting facilities, or delivery vehicles (again, not shown). Further, additional databases, such as contact information for operations personnel may be integrated with the PR system 412 or be accessed via the intranet 424.

The options for communicating between the CSR and the carrier's operations personnel will be determined in part as to the stage of the delivery process the package is being handled. For example, a package requiring attention at a sorting facility may result in certain types of recovery options for dealing with an issue, and may involve certain personnel. For example, each sorting facility may have a designed "PR contact" for address issues. On the other hand, if the package is on an airplane en route, then the recovery options may be different, and require alternative means of communications. Finally, if the package is en route on the final delivery leg to the consignee, the CSR may be using wireless communication with the dispatch driver.

Billing

The billing for this service may occur in several ways, including a flat rate for every package indicated as such, with the surcharge added to the customer's account on a billing cycle basis. Alternatively, the billing may be incremental, based on the actions incurred for a particular package, with surcharges for performing additional icing, or upgrading of service. In yet another embodiment, a combination of various forms of charges may be levied, including an accessorial charge, with the increment in line flight costs or other billable actions specifically charged to an indicated account.

Reports

The closed case logs can serve as data for generating reports for a particular customer, typically the consignor. The closed case files can be used to ascertain how many PR packages were sent in a time period, what percentage of them were required intervention, the outcomes, and the so forth. The data can be used to ascertain particular problem in certain routes, or with certain types of recurring problems. The PR MIS system may generate such reports, and present them to the user in graphical form. It is possible that the closed case logs can be archived and stored in a different database system, so as to keep the storage requirements low for the PR database.

Inputs Regarding System Level Impacts

The PR MIS processor 412 of FIG. 4 can receive other inputs (not shown), which are not related to a particular package, but which provides information of system level impacts. These include notifications of weather delays at one or more airports, equipment malfunctions or other delays (e.g., traffic congestion) impacting a particular airplane or delivery vehicle, or indicating other events or conditions at a sorting facility. In short, this information could comprise any information impacting delivery of a plurality of packages (both PR and non-PR). It can be readily appreciated that the information can be varied, and it is not possible to describe all possibilities herein. Typically, such information will be provided in a manner allowing a group of packages to be identified. For example, many packages are grouped into a larger container, which is tracked as a separate type of container, and a database maintains the relationship between the large container and the packages contained therein. For example, the large containers loaded as cargo into airplanes are sometimes referred to as "igloos" based on their shape. Thus, if the large container, such as an igloo, is associated with an aircraft and delays are currently being experienced at an airport, identification of the igloo allows identification of all the relevant packages conveyed therein. Typically, databases are maintained with the mapping, and a number of 'nested' container may be involved.

In this manner, system level impacts can be determined with respect to the appropriate packages in the PLD database. In one embodiment, a flag is recorded in the PLD database indicating that the package may be delayed. A separate application program could periodically poll the PLD database to ascertain and identify which of these are PR packages that may be impacted. Whether the information is maintained in one database or several, and whether they are implemented in a single computing system, a distributed system, or some other architecture is an implementation dependent aspect.

Such system level impacts can be provided to the PR system, which then identifies those PR packages currently, or scheduled, to be conveyed the airplane or vehicle, or otherwise processed at the impacted facilities or locations. This allows the PR system to proactively indicate a potential service impacting scenario, and notify the consignor, consignee, CSR, or other party of the potential problem. The notification message can be via email, and can include the package tracking number, and an address for the recipient to contact the carrier, including, for example, a web-site address (e.g., URL) and/or a telephone number or email address of a CSR focusing on aiding customers with PR related problems. Further, the PR system (or the CSR after being notified) may generate or request appropriate recovery actions for each of the PR packages. For example, time-sensitive packages which are anticipated to be delayed because of weather conditions at an airport may be rerouted via another airport. Packages which may require additional temperature stabilization to remain cool may result in exception handling processing indications when sorted at a facility. Such packages, when scanned, are shunted aside for exception handling, and local package handling personnel are notified that refrigeration and/or re-icing should occur, and the package should be routed as normal thereafter. Other packages may undergo a service level upgrade, e.g., from $2^{nd}$ day air to next day air. Still, other packages may be required to be sent back to the shipper.

Severity codes can be defined and associated with a package describing the impact of system impacts (as well as package-specific circumstances). The use of severity codes can be used to prioritize investigations, or prioritize potential actions taken by the carrier to resolve the problem.

In some embodiments, the actions taken by the carrier will first be checked with the customer profile to see if the actions are compatible with the recovery actions allowable for the package as indicated by that customer. If the action is not identified as allowable, the CSR may be notified that customer contact is required, and manual intervention may be required. Generally, it is preferable that automatic intervention, wherever possible, occurs. Hence it is desirable that the customer profile contain as much information as possible as to how anticipated problems should be resolved. Even in the case of automatic intervention, the PR system notes the potential problem and intervention performed in the case log for the package. It is implementation dependent as to whether the customer will be notified of the action taken by the carrier. This may be dependent on the particular action taken.

Automatic Notifications

The customer (consignor, consignee, or third party, if authorized) may desire to receive automatic notifications, such as via telephone calls or emails, reporting the existence of problems and their resolutions, including with the ultimately delivery of the product at the end destination. The customer's preference and contact information would be contained in the customer profile, and the PR system would process each case log file to determine the appropriate action in the given circumstances. It is possible that automatic notifications could comprise normal delivery events, abnormal events or conditions, or a combination. Confirmation could be provided to the various or multiple parties. Severity codes can be defined to describe the abnormal events in the case log, and reporting actions can be made dependent on the severity codes. It is also possible for the carrier to define whether the CSR is notified first (and then notifies the customer) or whether both the CSR and customer are simultaneously notified.

Miscellaneous

The above infrastructure can be used to provide other exception handling, which may originate from the customer. Again, the possible conditions for this are varied, and cannot be exhaustively identified. For example, a consignor may initiate a shipment, and subsequently find out that certain events require the package to be returned to the consignor, for repackaging or replacement.

In such a situation, the consignor would typically communicate to the carrier the need to retrieve or intercept the package, while the package is in transit to the consignor. The communication from the consignor (or other party) to the carrier typically occurs via telephone or via electronic messaging (via email, or accessing a web-site). The consignor would identify themselves as the consignor (typically via a customer identifier number) and the package (which would be identified either by tracking number, or the date of shipment and other related information allowing the customer service representative to identify the package tracking number). The customer service representative would then be able to retrieve the customer profile and initiate a case log if one is not already created). The customer service representative would obtain verbally from the consignor facts regarding the situation, and note these in the case log, and as well as any action to be taken by the carrier, which would including recording instructions to other carrier personnel accessing the case log. The system will typically automatically record the timestamp of the input provided, and the particular source of the information (e.g., a representative number or name). The PR system would store the information in the PR database. In one embodiment, the PR system would then indicate an exception condition associated with the package's PLD record in the PLD database. The exception condition could be a generic flag, or an indication specific to a PR condition.

In interacting with the customer, the customer service representative would generally confirm the status of the package first, namely that the package has not been delivered. (If delivered, the carrier does not have possession of the package, and would inform the caller of the situation.) Presuming the package is being processed by the carrier, the customer service representative would note where the package is in the delivery process. The PR system would facilitate retrieval of the appropriate personnel and their contact information for the current or scheduled locations of the package. For example, if the package is currently at the carrier's Pittsburgh sorting facility, the PR system would provide the name of the PR exception handling person ("PR personnel contact") at the Pittsburgh sorting facility. The CSR could then contact the PR contact and leave a message indicating to be aware of the package. If the package is on the package delivery vehicle, the system would provide the appropriate address for communicating with the driver of the vehicle. At this point, the exact procedures to intercept the package may depend on the location of the package relative to the overall processing by the carrier.

Presumably, the above occurs as the package is in the carrier's processing infrastructure. Assume, for sake of illustration, that the package is on its way to Pittsburgh when the consignor initiates the intercept request to the CSR. As it arrives in the Pittsburgh facility, the package will be scanned (or otherwise read by a machine using other types of technology). The scanning process accesses the PLD database to ascertain its route, and in this case, the PLD database detects that a PR exception condition has been recorded. In response, the scanning equipment provides a suitable indication (i.e., a beep, visual warning indication, etc.) alerting the sorting personnel of the exception. The sorting personnel will set the package aside, and either access the case log, or bring the situation to the attention of the PR personnel contact. The PR personnel contact having been made aware of the situation recognizes the package as the aforementioned exception, and can act accordingly. While in the context of the "intercept" service, the appropriate action is to reroute the package back to the sender, in other contexts, the appropriate action may be to re-ice (e.g., temperature stabilize) the package. Other embodiments may simultaneous perform multiple actions; such as initiate an intercept action and issue recovery instructions.

It will be appreciated that many variations of the above systems and methods are possible, and that deviation from the above embodiments are possible, but yet within the scope of the claims. Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of managing the delivery of a package, comprising the steps of:
   recording an indication associated with the package in a package level detail (PLD) database indicating a potentially service impacting condition occurring during shipping of the package, the potentially service impacting condition being a condition that can potentially adversely impact delivery of the package;
   monitoring the PLD database via at least one computer to determine whether the indication has been recorded in the PLD database;
   in response to detecting that the indication has been recorded in the PLD database:
   (A) identifying a package level tracking number associated with the package;
   (B) retrieving a customer profile associated with the tracking number, wherein the customer profile contains contact information for a user;
   (C) recording the time of the notification of the electronic message in a log associated with the package tracking number;
   (D) in response to the potentially service impacting condition not matching a predefined potentially service impacting condition:
      (1) send the customer an electronic message to a customer address based on the contact information contained in the customer profile, wherein the electronic message is adapted to notify the user of the potentially service impacting condition;
      (2) receive input from the customer regarding actions to be taken in response to the potentially service impacting condition occurring;

(3) retrieve the loci associated with the package;
(4) record in the loci information related to the potentially service impacting condition, the information comprising the actions to be taken provided by the customer; and
(E) recording information in the log associated with the package, wherein the information indicates the action to be taken with respect to the package; and
(F) in response to the package being scanned at a sorting facility:
(1) issuing an exception alert via the at least one computing device notifying personnel handling the package at the sorting facility of an exception associated with the handling of the package;
(2) accessing the log; and
(3) providing information based on the log to the personnel handling the package indicating the action to be taken with respect to the package, wherein the personnel handling the package perform the action indicated with respect to the package.

2. The method of claim 1 wherein the action to be taken with respect to the package pertains to temperature stabilization of the package.

3. The method of claim 1 wherein the step of providing the information indicating the action to be taken with respect to the package to the personnel further comprises:
receiving a request from the personnel for the log identified by the tracking number; and
providing information from the log to the personnel handling the package, wherein the information is provided by the personnel handling the package using a computer to access the log.

4. The method of claim 1 further comprising the step of:
receiving shipping information pertaining to the package, the shipping indication including an indication of proactive intervention.

5. The method of claim 1 further comprising the step of sending the user a second electronic message at the user address, wherein the information included in the electronic message includes information regarding the action taken with respect to the package by the carrier.

6. A system for proactively monitoring and intervening in the delivery of a package for a customer comprising:
a proactive monitoring and intervention ("PR") database storing 1) a customer transit profile that is associated with the customer and comprises customer contact information including a name and contact address, the customer profile further including information regarding actions to be taken in response to a predefined potentially service impacting condition associated with delivery of the package occurring during shipping of the package, and 2) at least one log associated with the package, the log including information regarding status and actions taken in conjunction with the package as a result of the predefined potentially service impacting condition associated with the delivery of the package occurring;
a package level detail ("PLD") database comprising a tracking number of the package, the PLD database further storing an indication that a potentially service impacting condition has occurred during shipping of the package;
a processor in communication with the PLD database and the PR database, the processor configured to:

identify the package in the PLD database and detect a presence of the indication that the potentially service impacting condition has occurred; and
in response to detecting the presence of the indication that the potentially service impacting condition has occurred:
(A) determine whether the potentially service impacting condition matches the predefined potentially service impacting condition;
(B) in response to the potentially service impacting condition not matching the predefined potentially service impacting condition:
(1) send the customer an electronic message to a customer address listed in the customer contact information stored in the PR database that the potentially service impacting condition has occurred;
(2) receive input from the customer regarding actions to be taken in response to the potentially service impacting condition occurring;
(3) retrieve the log associated with the package;
(4) record in the log information related to the potentially service impacting condition, the information comprising the actions to be taken provided by the customer; and
(5) initiate an electronic notification to personnel handling the package; and
(C) in response to the potentially service impacting condition matching the predefined potentially service impacting condition:
(1) send the customer an electronic message to the customer address listed in the customer contact information stored in the PR database that the potentially service impacting condition has occurred;
(2) retrieve the log associated with the package;
(3) record in the log information related to the potentially service impacting condition, the information comprising the actions to be taken provided by the customer profile; and
(4) initiate an electronic notification to personnel handling the package; and
a customer service representative workstation in communication with the processor and operated by the personnel handling the package, the workstation initiating a request to retrieve the customer profile and the log associated with the package after receiving the electronic notification, wherein the personnel handling the package:
(A) access the information from the log regarding the actions to be taken in response to the predefined condition associated with delivery of the package having occurred during shipping of the package; and
(B) record in the log actions taken in conjunction with the package as a result of the predefined potentially service impacting condition having occurred.

7. The method of claim 1, wherein the contact information in the customer profile comprises a first user address for high value packages and a second user address for regular packages and the step of sending the user the electronic message comprises the sub-steps of:
(1) determining whether the package is a high value package;
(2) in response to determining the package is a high value package, sending the user the electronic message to the first user address based on the contact information contained in the customer profile; and (3) in response to determining the package is not a high value package, sending the user the electronic message to the second user address based on the contact information contained in the customer profile.

8. A method of managing the delivery of a package, comprising the steps of:
   (1) recording an indication associated with the package in a package level detail (PLD) database indicating a potentially service impacting condition occurring during shipping of the package, the potentially service impacting condition being a condition that can potentially adversely impact delivery of the package;
   (2) monitoring the PLD database via at least one computer to determine whether the indication has been recorded in the PLD database;
   (3) in response to detecting that the indication has been recorded in the PLD database:
      (A) retrieving a customer profile associated with a user, wherein the customer profile contains contact information for the user and one or more anticipated potentially service impacting conditions and a corresponding action to be taken with respect to the package for each anticipated potentially service impacting condition;
      (B) determining whether the potentially service impacting condition matches one of the anticipated potentially service impacting conditions;
      (C) in response to the potentially service impacting condition matching one of the anticipated potentially service impacting conditions, recording information in the log associated with the package, the information indicating an action comprising the corresponding action from the customer profile to be taken with respect to the package;
      (D) in response to the potentially service impacting condition not matching one of the anticipated potentially service impacting conditions:
         (1) sending the user an electronic message to a user address based on the contact information contained in the customer profile, wherein the electronic message is adapted to notify the user of the potentially service impacting condition;
         (2) in response to sending the user the electronic message notifying the user of the potentially service impacting condition, receiving input from the user regarding a user provided action to be taken with respect to the package in light of the potentially service impacting condition;
         (3) retrieve the loci associated with the package; and
         (4) recording information in the log associated with the package, wherein the information indicates the action comprising the user provided action to be taken with respect to the package; and
      (E) in response to the package being scanned at a sorting facility:
         (1) issuing an exception alert via the at least one computing device notifying personnel handling the package at the sorting facility of an exception associated with the handling of the package;
         (2) accessing the log; and
         (3) providing information based on the log to the personnel handling the package indicating the action to be taken with respect to the package, wherein the personnel handling the package perform the action indicated with respect to the package.

* * * * *

UNITED STATES PATENT AND TRADEMARK OFFICE
CERTIFICATE OF CORRECTION

PATENT NO. : 8,489,472 B2  
APPLICATION NO. : 12/117534  
DATED : July 16, 2013  
INVENTOR(S) : Boitet et al.

Page 1 of 1

It is certified that error appears in the above-identified patent and that said Letters Patent is hereby corrected as shown below:

In the Claims:

Column 17, Claim 1,

Line 1, "loci" should read --log--

Line 2, "loci" should read --log--

Column 20, Claim 20,

Line 15, "loci" should read --log--

Signed and Sealed this
Seventeenth Day of September, 2013

Teresa Stanek Rea
*Deputy Director of the United States Patent and Trademark Office*